US005165656A

United States Patent [19]

Maier et al.

[11] Patent Number: 5,165,656

[45] Date of Patent: Nov. 24, 1992

[54] ADJUSTING BUSH FOR AN ELECTROMAGNETICALLY ACTUATABLE VALVE

[75] Inventors: Martin Maier, Moeglingen; Ferdinand Reiter, Markgroeningen; Dieter Etzel, Eberdingen-Nussorf, all of Fed. Rep. of Germany

[73] Assignee: Robert Bosch GmbH, Stuttgart, Fed. Rep. of Germany

[21] Appl. No.: 834,099

[22] Filed: Feb. 12, 1992

[30] Foreign Application Priority Data

Mar. 26, 1991 [DE] Fed. Rep. of Germany ....... 4109868

[51] Int. Cl.[5] ....................... F16K 31/06; F02M 51/06

[52] U.S. Cl. ............................. 251/129.21; 239/585.4

[58] Field of Search ................ 251/129.21; 239/585.4, 239/585.5

[56] References Cited

U.S. PATENT DOCUMENTS 4,575,009 3/1986 Giraudi .

4,625,919 12/1986 Soma et al. ...................... 239/585.4

4,700,891 10/1987 Hans et al. ................. 251/129.21 X 4,984,744 1/1991 Babitzka et al. ........... 251/129.21 X

*Primary Examiner*—Arnold Rosenthal

*Attorney, Agent, or Firm*—Edwin E. Greigg; Ronald E. Greigg

[57] ABSTRACT

An electromagnetically actuatable valves, including an adjusting bush pressed into a flow bore of a core of a coil in order to adjust a spring force of a restoring spring. The novel adjusting bush includes at least two longitudinal beads, extending in the direction of the longitudinal valve axis on its circumference that protrude past a jacket of the adjusting bush in the radial direction. The transitional region between the jacket and each of the longitudinal beads is embodied as rounded, at least in the direction of the longitudinal valve axis. Thus when the adjusting bush is pressed into the flow bore of the core, the production of chips at the adjusting bush and flow bore is prevented. The adjusting bush is especially well-suited for injection valves of fuel injection systems in internal combustion engines.

10 Claims, 2 Drawing Sheets

ADJUSTING BUSH FOR AN ELECTROMAGNETICALLY ACTUATABLE VALVE

BACKGROUND OF THE INVENTION

The invention is based on an adjusting bush for an electromagnetically actuatable valve and on a method for producing an adjusting bush as defined hereinafter.

German Offenlegungsschrift 33 06 304 discloses an adjusting bush for an electromagnetically actuatable valve which is pressed into a flow bore, embodied concentrically with the longitudinal valve axis, of the core and which has two encompassing beads on its circumference that have a larger diameter than the flow bore. The adjusting bush is used to adjust the spring force of a restoring spring acting upon the valve closing body. On its end toward the valve closing body, the adjusting bush has a closure face extending vertically of the longitudinal valve axis, so that the bead oriented toward the valve closing body ends with a sharp edge, without any transitional region, at the closure face. The transition between the middle region, having a smaller diameter than the flow bore, to the two beads is also, however, embodied with a sharp edge in the immediate vicinity of the flow bore of the core. Thus, in the known adjusting bush, the danger exists that when the adjusting bush is pushed into the flow bore of the core in a direction of the longitudinal valve axis and thus at right angles to the encompassing beads, chips form, which during operation can cause destruction of the valve.

OBJECT AND SUMMARY OF THE INVENTION

The adjusting bush according to the invention has an advantage over the prior art that when the adjusting bush is pressed into the flow bore of the core in the direction of the longitudinal valve axis, the formation of chips in the adjusting bush and in the flow bore wall is effectively and simply prevented. An adjusting bush of this kind can be produced simply and economically.

The method according to the invention for producing an adjusting bush has an advantage of enabling particularly simple, economical production of the adjusting bush.

To facilitate the introduction of the adjusting bush into the flow bore of the core and its centering in the flow bore, it is advantageous if an encompassing chamfer is formed on the circumference of the adjusting bush, toward at least one face end.

For a firm hold and exact centering of the adjusting bush in the flow bore of the core, it is especially advantageous if three longitudinal beads are formed on the circumference of the adjusting bush.

For simpler installation of the adjusting bush, it is advantageous if the adjusting bush has a longitudinal slit in the axial direction. An adjusting bush embodied in this way is not only capable of being thrust into the flow bore of the core with relatively little expenditure of force, but in addition displacement of the adjusting bush out of the predetermined position is prevented.

To avoid seizing of the material comprising the core and the material comprising the adjusting bush, it is especially advantageous if the adjusting bush is embodied from a rolled copper alloy to spring hardness.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
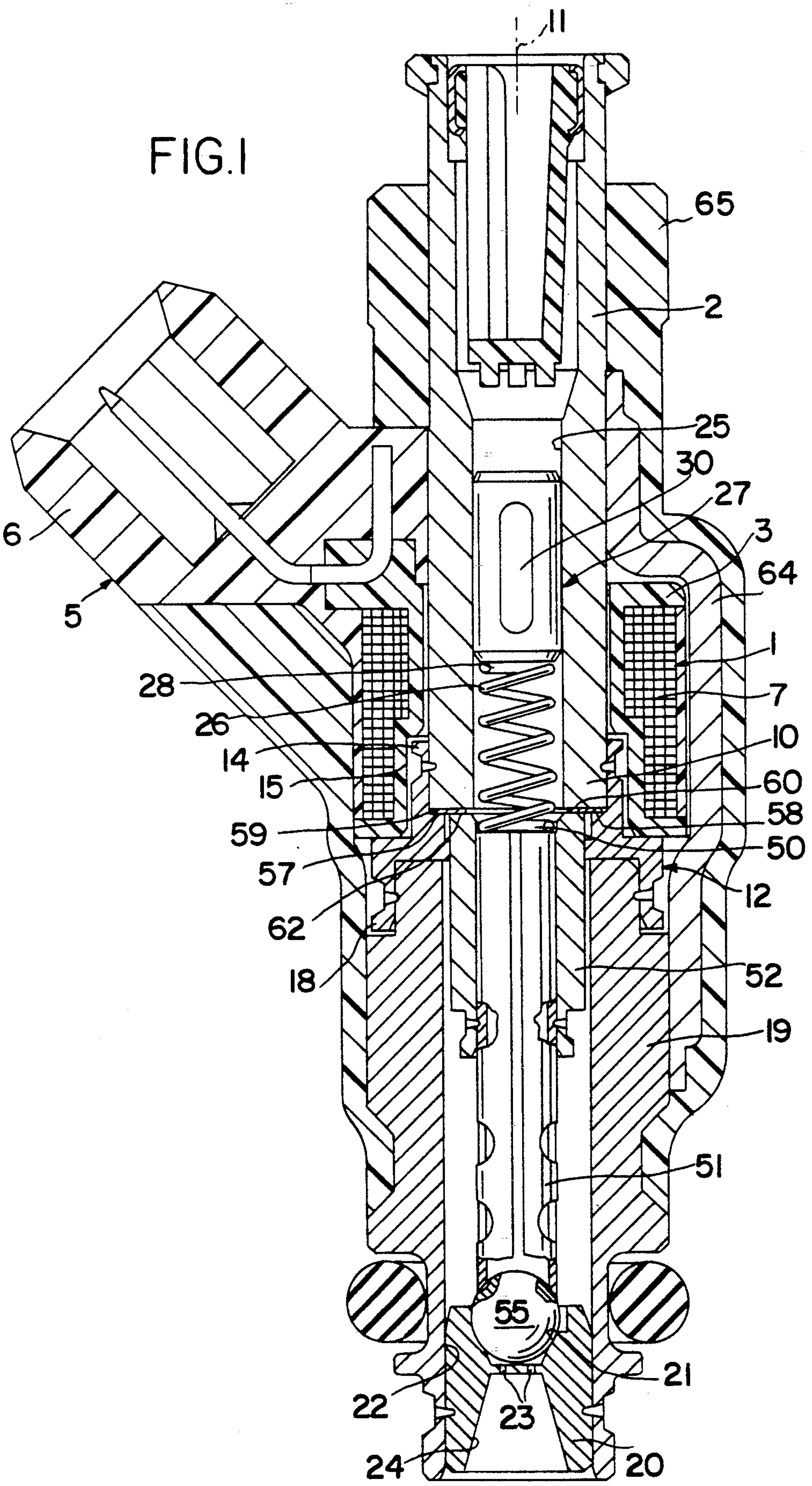
FIG. 1 shows a fuel injection valve having an adjusting bush in accordance with the exemplary embodiment of the invention.

The electromagnetically adjustable valve shown by way of example in FIG. 1, in the form of an injection valve for fuel injection systems for mixture-compressing internal combustion engines with externally supplied ignition, has a core 2 surrounded on one end by a magnet coil 1 and serving as a fuel inlet connection piece. The magnet coil 1 having a coil body 3 is provided with a plastic extrusion coating 5, and at the same time an electric connection plug 6 is extruded on as well. The coil body 3 of the magnet coil 1 is stepped in the radial direction and has a winding 7 that is also stepped in the radial direction.

A tubular metal intermediate part 12 is tightly joined, for instance by welding, to a lower end 10 of core 2, concentric with a longitudinal valve axis 11, and fits part way over the core end 10, with an upper cylindrical portion 14. The stepped coil body 3 fits part way over the core 2 and with a step 15 of larger diameter fits over the upper cylindrical portion 14 of the intermediate part 12. On its end remote from the core 2, the intermediate part 12 is provided with a lower cylindrical portion 18, which fits over a tubular nozzle holder 19 and is tightly joined to it, for instance by welding. A cylindrical valve seat body 20 is tightly mounted by welding in the downstream end of the nozzle holder 19, in a through bore 22 extending concentrically with the longitudinal valve axis 11. The valve seat body 20 has a fixed valve seat 21, oriented toward the magnet coil 1, and injection ports 23, for instance two in number, are disposed in the valve seat body 20 downstream of the valve seat. Downstream of the injection ports 23, the valve seat body 20 has a preparation bore 24 that widens frustoconically in the flow direction.

For adjusting the spring force of a restoring spring 26, a tubular adjusting bush 27 is pressed into a stepped flow bore 25 of the core 2, the flow bore extending concentrically with the longitudinal valve axis 11. The restoring spring 26 rests with one end on an end face 28 of the adjusting bush 27 toward the valve seat body 20. The opposite end of the bush 27 seats on the upper end of a connecting tube 51. The depth to which the adjusting bush 27 is pressed into the flow bore 25 of the core 2 determines the spring force of the restoring spring 26 and thus also influences the dynamic fuel quantity output during the opening and closing stroke of the valve closing body 55.

Figure 2:
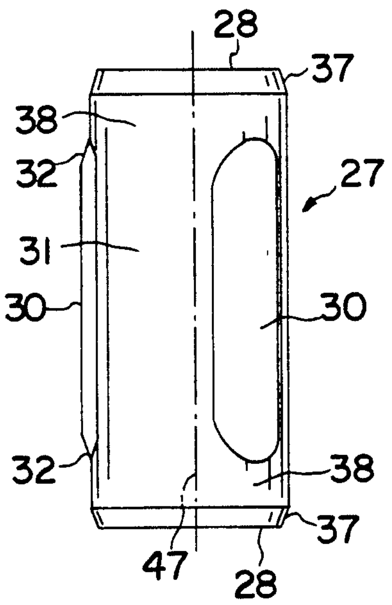
FIGS. 2 and 3 show the adjusting bush in accordance with the exemplary embodiment.
Figure 3:
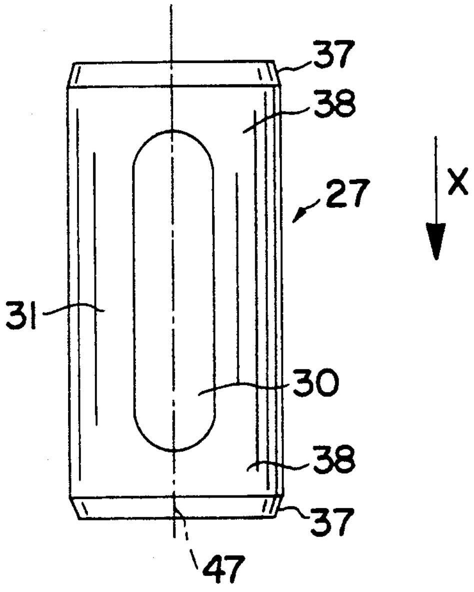
Figure 4:
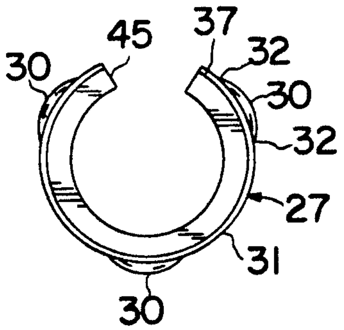
FIG. 4 is a view of the adjusting bush in the direction of the arrow X in FIG. 3.

FIGS. 2–4 show the adjusting bush 27 according to a first exemplary embodiment of the invention, the same embodiment that is also shown in FIG. 1. In FIG. 4, the adjusting bush 27 is shown in a view in the direction of the arrow X in FIG. 3. At least two longitudinal beads 30 are formed on the circumference of the adjusting bush 27 and protrude radially outward past a jacket 31 of the adjusting bush 27. Three longitudinal beads 30, for example, are provided on the circumference of the adjusting bush 27 in the exemplary embodiment shown and have their greatest length in the direction of the longitudinal valve axis 11. The length of the longitudinal beads 30 in the circumferential direction is substantially less than their length in the direction of the longitudinal valve axis 11. The three longitudinal beads 30 are spaced apart by equal distances from one another, by way of example. Between the jacket 31 and each of the longitudinal beads 30 extending past the jacket 31, there is at least one rounded transitional region 32 in the direction of the longitudinal valve axis 11. In the exemplary embodiment shown, the applicable transitional region 32 completely surrounds the longitudinal beads 30 of the adjusting bush 27. The longitudinal beads 30 themselves may, as shown in the drawings, be embodied as curved convexly outward, so that chip formation at the adjusting bush 27 and at the wall of the flow bore 25, when the adjusting bush 27 is pushed into the flow bore 25 of the core 2, is prevented.

The jacket 31 of the adjusting bush 27, when the adjusting bush 27 has been thrust into the flow bore 25 of the core 2, has a smaller diameter than the flow bore 25, so that the adjusting bush 27 rests with its longitudinal beads 30 against the wall of the flow bore 25. In the exemplary embodiment shown, a chamfer 37 with a diameter that decreases toward the end face 28 is formed out at the end 38 of the jacket 31 toward each end face 28 of the adjusting bush 27. However, it is also possible for the adjusting bush 27 to have a chamfer 37 on only one end 38 and to be thrust into the flow bore 25 of the core 2 with this end 38 leading. However, the chamfer 37 may be embodied as curved convexly outward.

The chamfer 37 on the end 38 of the adjusting bush 27 and jacket 31 thrust first into the flow bore 25 of the core 2, this jacket having a diameter reduced compared with the flow bore 25 when the adjusting bush 27 has been installed in the flow bore 25, makes it easier to introduce the adjusting bush 27 into the flow bore 25 of the core 2 and to center the adjusting bush 27 in the flow bore 25. For this reason, the longitudinal beads 30 extend over only part of the total axial length of the jacket 31 of the adjusting bush 27. A cylindrical end 38 of the adjusting bush 27 by which the bush is thrust first into the flow bore 25 and on which no longitudinal bead 30 extends, facilitates the centering of the adjusting bush 27.

Because the adjusting bush 27 of the exemplary embodiment is embodied as symmetrical toward both face ends 28, the installation of the adjusting bush in the flow bore 25 is simplified, because it does not matter by which face end 28 the adjusting bush 27 is introduced first into the flow bore 25.

In the axial direction, the adjusting bush 27 for example has a longitudinal slit 45, so that the adjusting bush 27 can be pressed radially resiliently and with relatively little expenditure of force into the flow bore 25 of the core 2, so that installation is facilitated. Since the slit adjusting bush 27, before it is installed in the flow bore 25, has a markedly larger diameter than the flow bore 25, in the state in which it is installed in the flow bore 25, the adjusting bush 27 is subject to high radially oriented tension. The longitudinal beads 30, which for instance are three in number, and which protrude past the jacket 31 of the adjusting bush 27, rest with a high, radially outwardly oriented pressure against the wall of the flow bore 25 of the core 2, thus assuring a very secure and reliable hold of the slit adjusting bush 27 in the flow bore 25 of the core 2. The production of the slit adjusting bush 27 is for instance performed as follows: in a first method step, a rectangular sheet-metal segment is produced; in a second method step, in a tool the at least two longitudinal beads 30 in the direction of a later longitudinal bush axis 47 of the sheet-metal segment, are formed in the sheet-metal segment by sheet-metal deformation; and in a third method step, the sheet-metal segment is rolled around the longitudinal bush axis 47 to make an adjusting bush 27 with a permanent longitudinal slit 45. Stainless spring steel or a copper alloy rolled to spring hardness, such as bronze, brass, Tombak (a copper-tin-zinc alloy) or copper-beryllium, for example, are suitable as the material for producing the adjusting bush 27 according to the invention. By using these copper alloys, seizing between the material of the core 2 and the material of the adjusting bush 27 is prevented.

The adjusting bush 27 may have approximately the same sheet-metal thickness as the jacket 31, in the region of the longitudinal beads 30. However, it is also possible for the sheet-metal thickness in the region of the longitudinal beads 30 to be greater or smaller than that of the jacket 31 of the adjusting bush 27.

The restoring spring 27 is supported by its end remote from the adjusting bush 27 in the downstream direction on a face end 50 of a connecting tube 51. A tubular armature 52 is joined, for instance by welding, to the end of the connecting tube 51 toward the restoring spring 27 On the other end of the connecting tube 51, a valve closing body 55 cooperating with the valve seat 21 of the valve seat body 20 and embodied for instance as a ball is joined to the connecting tube, for instance by welding.

Between one face end 57 of the end 10 of the core toward the armature 52 and a shoulder 58 of the intermediate part 12 leading to the upper cylindrical portion 14, an axial gap 59 is formed, in which a nonmagnetic stop disk 62 is disposed by wedging; the stop disk forms a remanent air gap between an end face 60 of the armature 52 toward the inflow side and the end face 57 of the core end 10 and limits the stroke of the valve closing body 55 upon the opening of the valve.

The magnet coil 1 is surrounded at least in part by at least one conducting element 64 embodied for instance as a hoop and serving as a ferromagnetic element; it rests with one end on the core 2 and with its other end on the connecting part 19 and is joined to them by soldering or welding, for instance.

Part of the valve is encompassed by a plastic extrusion coat 65, which extends from the core 2 axially across the magnet coil 1 with the connection plug 6 and the at least one conducting element 64.

In the novel adjusting bush 27 having the longitudinal beads 30 extending in the direction of the longitudinal valve axis 11 and having the transitional regions 32 between the jacket 31 and the longitudinal beads 30, the production of chips at the adjusting bush 27 and at the wall of the flow bore 25 when the adjusting bush is pressed into the flow bore 25 of the core 2 is effectively prevented.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An adjusting bush for an electromagnetically actuatable valve, especially for an injection valve for fuel injection systems of internal combustion engines, having a metal core extending along a longitudinal valve axis, a fixed valve seat, a magnet coil and an armature by means of which a valve closing body cooperating with said fixed valve seat is actuated, a cylindrical adjusting bush, a restoring spring disposed concentrically to the longitudinal valve axis and acting upon the valve closing body and being supported by one end on said cylindrical adjusting bush pressed into a flow bore of the core, the bore of said core being embodied concentrically with the longitudinal valve axis, and at least two beads embodied on the circumference of the cylindrical adjusting bush, a jacket of said cylindrical adjusting bush, said two beads protrude radially outward past said jacket of the cylindrical adjusting bush, said at least two beads are embodied as longitudinal beads (30) extending in a direction of the longitudinal valve axis (11), said beads have their greatest extension in a direction of the longitudinal valve axis (11), and that at least one rounded transitional region (32) is formed on said cylindrical adjusting bush at least in the direction of the longitudinal valve axis (11), between the jacket (31) of the adjusting bush (27) and each of said at least two longitudinal beads (30).

2. An adjusting bush as defined by claim 1, in which three longitudinal beads (30) are embodied on the circumference of the adjusting bush (27).

3. An adjusting bush as defined by claim 1, in which the adjusting bush (27) has a longitudinal slit (45) in the axial direction.

4. An adjusting bush as defined by claim 2, in which the adjusting bush (27) has a longitudinal slit (45) in the axial direction.

5. An adjusting bush as defined by claim 1, in which the adjusting bush (27) is produced by rolling of a deformed sheet-metal segment.

6. An adjusting bush as defined by claim 2, in which the adjusting bush (27) is produced by rolling of a deformed sheet-metal segment.

7. An adjusting bush as defined by claim 3, in which the adjusting bush (27) is produced by rolling of a deformed sheet-metal segment.

8. An adjusting bush as defined by claim 1, in which an encompassing chamfer (37) is embodied on the circumference of the adjusting bush (27) toward at least one face end (28).

9. An adjusting bush as defined by claim 1, in which the adjusting bush (27) is embodied of a stainless spring steel.

10. An adjusting bush as defined by claim 1, in which the adjusting bush (27) is embodied of a copper alloy rolled to spring hardness.

* * * * *